United States Patent [19]
Strözel et al.

[11] Patent Number: 5,099,160
[45] Date of Patent: Mar. 24, 1992

[54] POWERED HAND TOOL HAVING AN ENCLOSED-VENTILATED DRIVE MOTOR

[75] Inventors: Reinhold Strözel, Leinfelden-Echterdingen; Wilhelm Schwarze; Helmut Stirm, both of Stuttgart, all of Fed. Rep. of Germany

[73] Assignee: Robert Bosch GmbH, Stuttgart, Fed. Rep. of Germany

[21] Appl. No.: 602,331
[22] PCT Filed: Apr. 6, 1989
[86] PCT No.: PCT/DE89/00211
§ 371 Date: Dec. 3, 1990
§ 102(e) Date: Dec. 3, 1990
[87] PCT Pub. No.: WO90/00828
PCT Pub. Date: Jan. 25, 1990

[30] Foreign Application Priority Data
Jul. 16, 1988 [DE] Fed. Rep. of Germany ....... 3824234

[51] Int. Cl.⁵ .......................... H02K 9/26; H02K 7/14
[52] U.S. Cl. ......................... 310/56; 310/47; 310/88
[58] Field of Search ....................... 310/50, 52, 56, 47, 310/58, 88

[56] References Cited
U.S. PATENT DOCUMENTS

| | | | |
|---|---|---|---|
| 2,769,105 | 10/1956 | Altschwager et al. | 310/88 |
| 3,959,677 | 5/1976 | Grieb | 310/50 |
| 4,385,276 | 5/1983 | Bitzel | 310/50 |
| 4,399,378 | 8/1983 | Krumm et al. | 310/56 |
| 4,564,778 | 1/1986 | Yoshida | 310/156 |

FOREIGN PATENT DOCUMENTS

| | | | |
|---|---|---|---|
| 0805408 | 5/1951 | Fed. Rep. of Germany | 310/56 |
| 0052744 | 5/1945 | France . | |

*Primary Examiner*—Steven L. Stephan
*Assistant Examiner*—C. LaBalle
*Attorney, Agent, or Firm*—Michael J. Striker;

[57] ABSTRACT

The powered hand tool for machining includes an enclosed drive motor having a rotor shaft and is provided with at least one interior air duct through which drawn-in cooling air passes to cool the drive motor. To prevent the drive motor from being clogged or damaged by magnetizable dust, which is produced from the machining process among other things, a permanent magnet is nonrotatably attached to the rotor shaft and also located in the air duct or ducts. The invention also resides in an air-cooled drive motor having a cooling-air flow with a permanent magnet located in the vicinity of the cooling-air flow and fixed nonrotatably to the motor shaft.

7 Claims, 1 Drawing Sheet

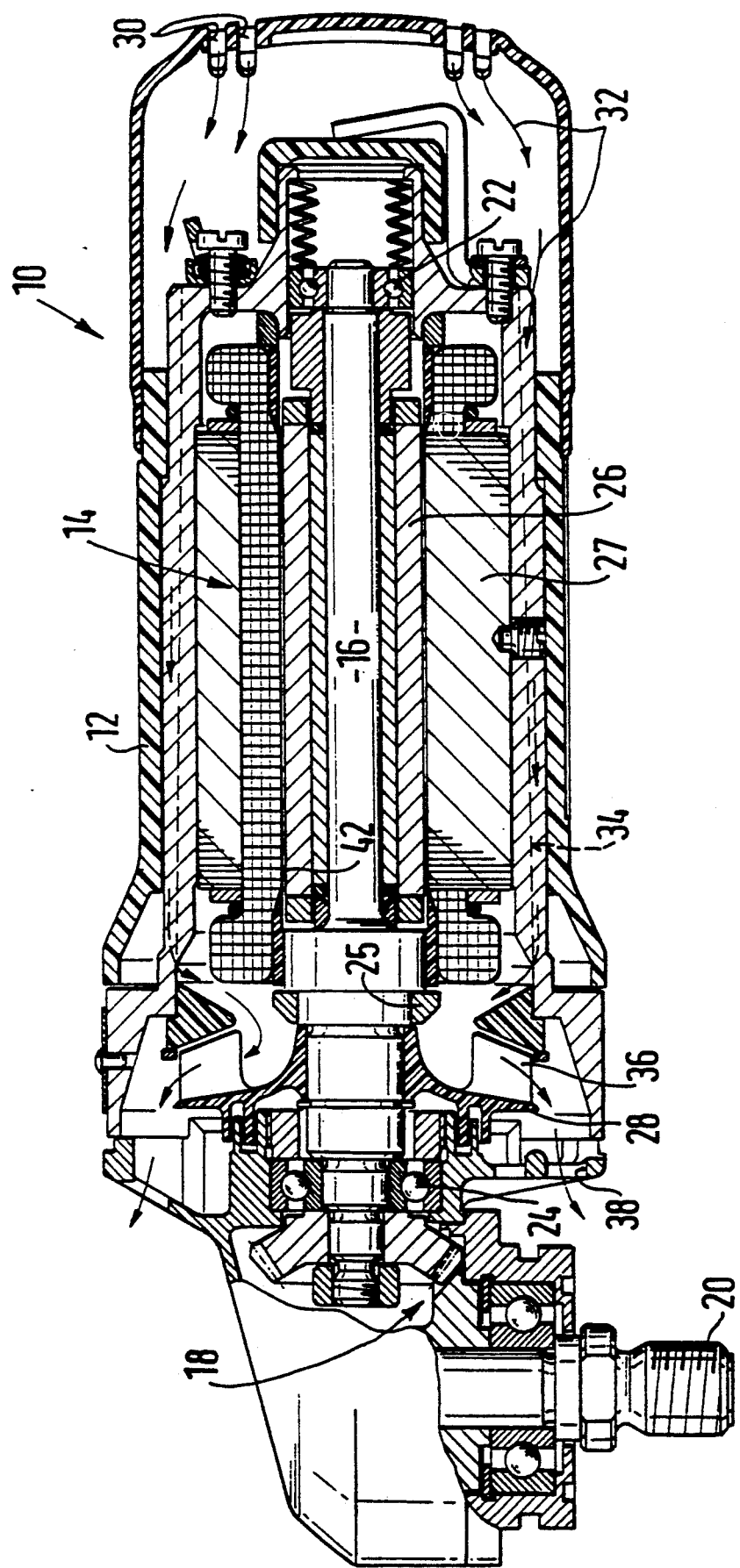

POWERED HAND TOOL HAVING AN ENCLOSED-VENTILATED DRIVE MOTOR

BACKGROUND OF THE INVENTION

The invention relates to a powered hand tool for machining and, more particularly, to a powered hand tool for machining magnetizable materials.

The invention is based on a powered hand tool having an enclosed ventilated drive motor, particularly an electric drive motor, in which air passes from the ambient atmosphere into the interior of the powered hand tool to cool the motor during operation. Such hand tools are well known, e.g. the angle grinder. To cool the windings of the electric motors of these powered hand tools, ambient air is as a rule blown through cooling-air ducts passing through the stator winding, a fan wheel mounted on the rotor shaft providing the necessary forced convection.

In enclosed-ventilated motors, the solid particles, occurring in particular in grinding machines, in the cooling-air flow create problems. These solid particles can cause damage on their way through the interior of the motor. Thus, for example, EP-A-0,261,306 teaches a protective means for the end windings of the armature of the electric motor having ribs which project above the end windings and deflect away the stray solid particles, before they can strike the end windings.

However, with the device described there, metal particles drawn in with the drawn-in air cannot be prevented from penetrating into the interior of an electric motor and settling there.

Experience shows that the metal particles settle at the locations where turbulence occurs in the flow of the drawn-in air on account of cross-sectional changes in the cooling-air channel and where there are at the same time powerful magnetic forces. The magnetic flux in the area of the annular gap between the rotor and the stator of an electric machine is particularly strong. It has been found in tests that the metal particles carried along with the drawn-in air mostly collect in this annular gap. The force of attraction of the magnetic field prevailing in the annular gap is so great there that even improved seals or a narrower gap between rotor and stator cannot reliably prevent dust laden with magnetisable particles from penetrating into the annular gap between rotor and stator.

If sufficient steel/stone dust has collected in the annular gap between rotor and stator, failure of the machine occurs through seizure of the rotor on the stator or through clogging of the bearing.

SUMMARY OF THE INVENTION

It is an object of the present invention to provide a powered hand tool of the above-described kind having an enclosed ventilated drive motor, preferably an electric drive motor, which is cooled by a drawn-in cooling air flow through at least one air duct and in which dust, particularly steel and/or stone dust, formed by action of the tool, does not penetrate into the interior of the drive motor, especially the gap between the rotor and the stator.

According to the invention at least one permanent magnet is fixed to the rotor shaft and positioned in the air duct.

The invention also resides in an air-cooled drive motor having a rotor shaft, a cooling air flow and at least one air duct through which the cooling air is drawn, in which at least one permanent magnet is provided in the vicinity of the air duct.

Compared with the prior art, the powered hand tool according to the invention, has the advantage of reliably preventing the penetration of grinding dust laden with magnetizable material into the annular gap between rotor and stator.

The simplicity of the invention can be considered to be a further advantage. Thus, it is sufficient to arrange a permanent magnet in the area of the cooling-air duct, which permanent magnet can attract the grinding dust drawn in with the cooling air and laden with magnetisable material.

Several embodiments of the invention are possible. First, the drive motor is advantageously an enclosed electric motor, which has a stator spaced from the rotor by an annular gap extending longitudinally along the rotor shaft. A preferred means for providing a cooling-air flow is, advantageously, a fan wheel attached to the rotor shaft near the rotor. The permanent magnet is advantageously attached near the annular gap between the rotor winding and the fan wheel. It is also advantageous, if the permanent magnet is located in the air duct at a location where the speed and flow direction of the cooling-air flow changes, i.e. at a point where the air flow velocity changes.

Advantageously the hand tool is provided with a tool for machining, such as a grinding disk, on its front end, with outlet openings at its front end for the cooling air flow and with inlet air openings on its rear end for the air duct or ducts. The permanent magnet attached between the fan wheel and the rotor winding can be an annular magnet. Metal particles are pulled from the annular gap by the magnet, so that they do not clog the annular gap by the permanent magnet and are then flung from the rotating permanent magnet and out the outlet openings in the air flow.

BRIEF DESCRIPTION OF THE DRAWING

The objects, features and advantages of the present invention will now be illustrated in more detail by the following detailed description, reference being made to the accompanying drawing in which:

The sole FIGURE is a longitudinal cross sectional view through an exemplary embodiment of an angle grinder according to the invention.

DETAILED DESCRIPTION OF AN EXEMPLARY EMBODIMENT

An angle grinder 10 has a housing 12, which also serves as a handle and in which an electric motor 14, constructed in the exemplary embodiment as a high-frequency motor, is arranged. Its rotor shaft 16 drives an output spindle 20 via an angular gear 18, to which output spindle 20 a disk-shaped grinding tool (not shown here), for example, can be fixed.

The rotor shaft 16 is mounted in two antifriction bearings 22 and 24. The rotor 26, an annular permanent magnet 25 and a fan wheel 28 are nonrotatably connected between the antifriction bearings 22 and 24 to the rotor shaft 16. In this arrangement, various diameters of the rotor shaft 16 serve in a known manner to center and axially position the rotor 26, annular permanent magnet 25 and fan wheel 28. At the rear end (i.e. the end remote from the output spindle 20) of the angle grinder 10, apertures 30, which form inlet openings for an air flow 32 drawn in by the fan wheel 28, are arranged in the housing 12. The air flow 32 serving to cool the drive motor runs through recesses or air ducts 34, indicated by dash lines in the drawing and running essentially parallel to the rotor shaft 16, between the windings of the stator 27. The air flow 32 then leaves the angle grinder 10, after passing blades 36 of the fan wheel 28, through outlet openings 38 arranged in the front area of the housing 12.

As apparent from the drawing, the air flow 32, after leaving the recesses 34 in the stator 27, passes near the end, facing the fan wheel, of an annular gap 42 between rotor 26 and stator 27.

At this location, the air flow 32 swirled by the cross-sectional transition can be slowed down and at the same time deflected to such an extent that grinding dust laden with metal is attracted by the powerful magnetic forces prevailing in the annular gap 42. With regard to its magnetic effect, the annular permanent magnet 25 mounted in this area on the rotor shaft 16 is of such powerful design that it exceeds the magnetic forces spreading from the annular gap 42.

During operation of the angle grinder, metal particles which have collected on the permanent magnet 25 are flung off by the centrifugal forces occurring in such a way that they leave the machine with the drawn-in air through the outlet openings 38 and can no longer cause any damage to the electric motor.

Of course, a permanent magnet can also be used at another suitable location inside a powered hand tool; but the self-cleaning effect described above is obtained only in the arrangement described in the exemplary embodiment on a part, rotating at high rotational frequency, near the outlet opening.

Naturally, the invention can also be advantageously used in non-electric vane motors, that is, for example, vane motors driven by compressed air, in order to prevent the ingress of metal particles. The invention is also suitable for drive motors in an ambient atmosphere laden with magnetizable dust, which drive motors cannot be fully enclosed.

It will be understood that each of the elements described above, or two or more together, may also find a useful application in other types of structures differing from the types described above.

While the invention has been illustrated and described as embodied in a powered hand tool having an enclosed ventilated drive motor, it is not intended to be limited to the details, shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. In a powered hand tool for machining having an interior and including a rotor shaft (16) and an enclosed ventilated drive motor (14) having and driving the rotor shaft (16), said hand tool also being provided with at least one air duct communicating with an inlet opening and an outlet opening, drawn-in air from the ambient atmosphere passing through the interior in the air duct from the inlet opening to the outlet opening, in which said drive motor is an electric motor having a rotor and a stator with a longitudinal extent, said air duct passing through said electric motor substantially parallel to the longitudinal extent of the stator, the improvement comprising at least one permanent magnet (25) fixed to the rotor shaft (16) and positioned in the air duct, and wherein the stator and the rotor are spaced from each other so as to form an annular gap (42), the annular gap having a rear end in the vicinity of the air duct inlet opening and a front end in the vicinity of the air duct outlet opening, and the permanent magnet is located in the vicinity of the front end of the annular gap.

2. The improvement as defined in claim 1, wherein the permanent magnet is arranged in a part of the air duct, in which the drawn-in air flowing therein changes velocity.

3. The improvement as defined in claim 1, wherein the drive motor is an enclosed ventilated electric motor.

4. The improvement as defined in claim 1, wherein the permanent magnet is annular and is arranged around the rotor shaft (16).

5. In a powered hand tool for machining having an interior and including a rotor shaft (16) and an enclosed ventilated drive motor (14) having and driving the rotor shaft (16), said hand tool also being provided with at least one air duct communicating with an inlet opening and an outlet opening, drawn-in air from the ambient atmosphere passing through the interior in the air duct from the inlet opening to the outlet opening, also including a fan wheel (28) fixed to the rotor shaft (16) and a rotor, the improvement comprising at least one permanent magnet (25) fixed to the rotor shaft (16) and positioned in the air duct between the fan wheel (28) and the rotor.

6. In a powered hand tool for machining having an interior and including a rotor shaft (16) and an enclosed ventilated drive motor (14) having and driving the rotor shaft (16), said hand tool also being provided with at least one air duct communicating with an inlet opening and an outlet opening, drawn-in air from the ambient atmosphere passing through the interior in the air duct from the inlet opening to the outlet opening, also including a stator in the vicinity of the rotor shaft, a fan wheel attached to the rotor shaft for accelerating the drawn-in air and a tool for machining, said hand tool having a front end at which said tool for machining is located and an opposite rear end, the drawn-in air being drawn in the vicinity of the rear end of the hand tool and being accelerated by the fan wheel, and at least one air duct being arranged in the stator, the improvement comprising at least one permanent magnet (25) fixed to the rotor shaft (16) and positioned in the air duct near the fan wheel.

7. In an air-cooled drive motor having a rotor shaft and a cooling-air flow, and wherein the drive motor is also electric, and further comprising a rotor and a stator, the stator having an air duct passing therethrough through which the cooling-air flow passes, an annular gap being provided between the stator and rotor, and also including a fan wheel nonrotatably attached to the rotor to provide the cooling-air flow, the improvement comprising a permanent magnet (25) rotating with the rotor shaft in the vicinity of the cooling-air flow and arranged in a portion of the air duct, in which the cooling-air flow changes velocity, said portion being between the rotor and the fan wheel, so that said drive motor can operate in an ambient atmosphere containing magnetizable dust.

* * * * *